E. P. BATZEL.
ROTARY VALVE MECHANISM FOR GAS ENGINES.
APPLICATION FILED MAY 10, 1910.
1,071,686.
Patented Sept. 2, 1913.
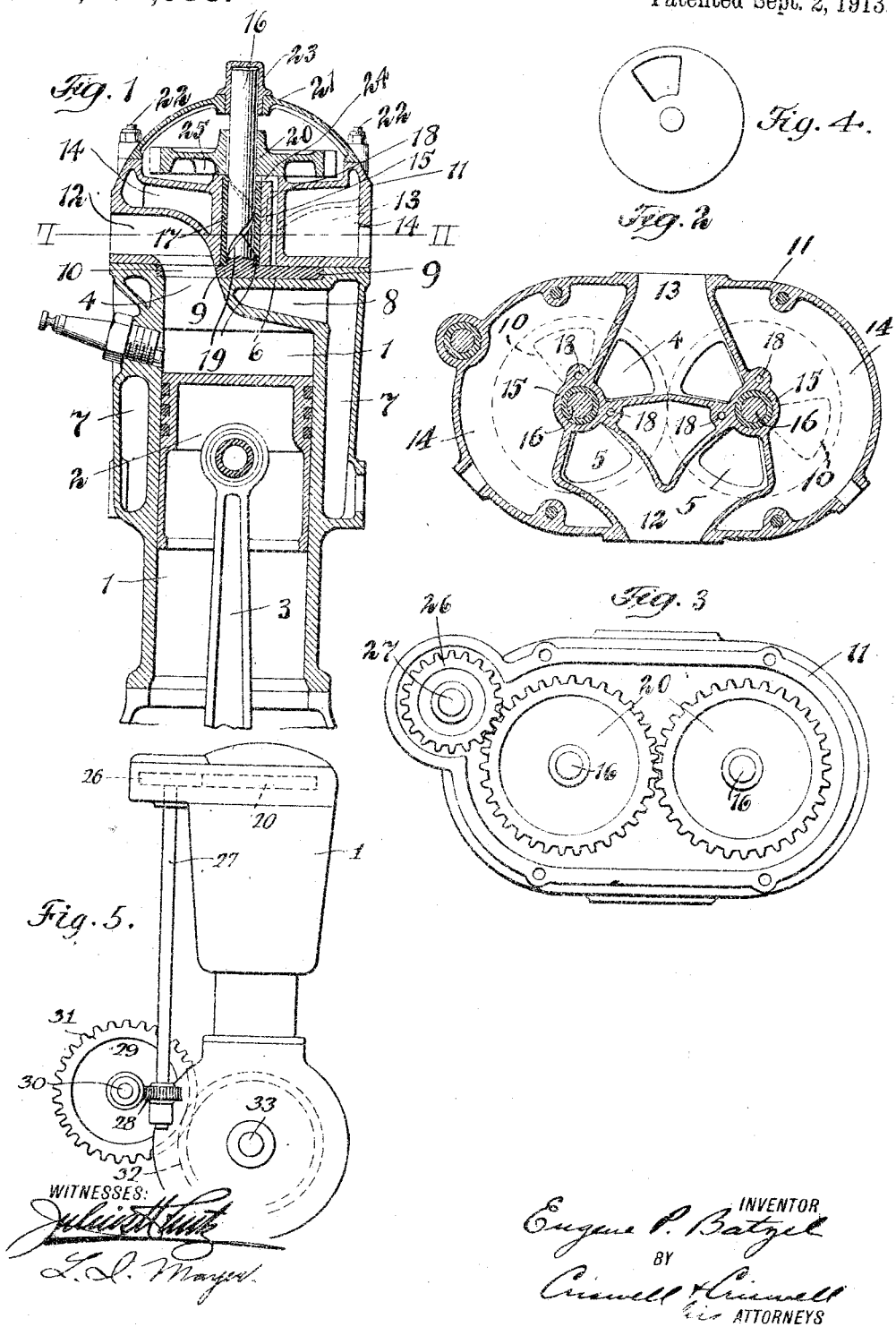

UNITED STATES PATENT OFFICE.

EUGENE P. BATZEL, OF DETROIT, MICHIGAN, ASSIGNOR OF ONE-HALF TO GEORGE C. BECK, OF SPOKANE, WASHINGTON.

ROTARY VALVE MECHANISM FOR GAS-ENGINES.

1,071,686.  Specification of Letters Patent.  Patented Sept. 2, 1913.

Application filed May 10, 1910. Serial No. 560,528.

*To all whom it may concern:*

Be it known that I, EUGENE P. BATZEL, a subject of the Czar of Russia, and resident of the city of Detroit, county of Wayne, and State of Michigan, have invented certain new and useful Improvements in Rotary Valve Mechanism for Gas-Engines, of which the following is a specification.

The main object of this invention is to provide an explosion engine of the compression type with a rotary valve, said valve being so timed as to open the inlet and exhaust ports of the engine at the proper points in the piston travel.

Another object of the invention is to provide a single disk valve and to rotate said valve in such manner that it will open the inlet and exhaust ports at the proper point in the piston travel, and to provide simple and effective means for cooling and lubricating said valve.

Another important object of the invention is to so locate and protect the rotary valve that it will not be subject to the gas pressures in the engine cylinder except where said valve extends across and closes the inlet and exhaust ports.

Other objects of the invention will appear hereinafter.

Referring to the drawings: Figure 1 is a vertical central sectional view of the engine cylinder and the valve mechanism; Fig. 2 is a horizontal sectional view on the line II—II of Fig. 1; Fig. 3 a detail plan view showing the valve operating gears, the inclosing cap being removed; Fig. 4 a detail plan view of the rotary valve; and Fig. 5 is a side elevation of the engine showing the gears for driving the valves from the engine shaft.

Referring to the various parts by numerals, 1 designates the engine cylinder, 2 the piston therein, 3 the connecting rod. The end of the cylinder is provided with an inlet port 4 and an exhaust port 5, and with a flat external circular valve seat 6 which is slightly larger in diameter than the engine cylinder. The water or cooling space 7 is formed around the cylinder in the usual way and extends in under the valve seat as at 8 in Fig. 1, so that said valve seat is cooled on its under side throughout practically its entire area. Fitted to rotate on this valve seat is a flat disk valve 9 formed with a single port 10 so placed that in the rotation of the valve, said port will register in succession with the inlet and the exhaust ports, said port being of the same size and shape as the cylinder ports. Secured to the end of the cylinder and inclosing the valve is a cylinder head 11, said head being formed with an inlet port 12 registering with the cylinder inlet port, and with an exhaust port 13 registering with the cylinder exhaust. This head is formed with a water space 14 which surrounds the inlet and exhaust ports and extends over the greater portion of the rotary valve. It will thus be seen that the valve is cooled on its upper and lower surfaces throughout the greater portion of its area.

The cylinder head is formed with a central hub 15 through which the valve stem 16 extends, said stem carrying the valve. This hub is provided with a bushing 17 in which the stem rotates, and is also formed with a vertical lubricating passage 18 arranged to deliver lubricant to the rotary valve. The valve stem within the bushing, and extending from the upper to the lower end of said bushing, is provided with a spiral lubricating groove 19. On the valve stem above the hub and above the cylinder head is secured a valve driving gear 20, said gear being inclosed by a gear case or cover 21. The cylinder head and the gear case are secured to the engine cylinder by means of bolts 22. The upper end of the gear case is fitted with a bushing 23 to receive the upper end of the valve stem. The upper end of the hub is formed with a horizontal groove 24 which extends inwardly from the upper end of the lubricating channel or duct 18; and the valve driving gear is formed with an inwardly extending slot 25 at a point directly over the valve port, said slot being adapted to register with the groove 24, as the gear rotates, to permit lubricant to pass from the upper end of the cylinder head through said groove. The solid portion of the gear covers the upper end of the lubricating groove and channel, and cuts off communication between said groove and channel, and the interior of the valve case except when the slot 25 is in register therewith.

When the engine cylinders are arranged in pairs as illustrated in Fig. 2 the inlet port for each cylinder is connected to the single inlet port on the cylinder head, and the exhaust ports for both cylinders are connected to a single exhaust in the head. This permits of a very simple and compact arrangement of the parts. As shown in Fig. 2, the hubs of the cylinder head are each provided with two lubricating channels 18, one being arranged between the inlet and exhaust port on the said head, and the other being arranged just beyond the inlet port in the direction of rotation of the valve. As shown in Fig. 3 the valve driving gears intermesh, and one of said gears is driven by a pinion 26 mounted on the vertical shaft 27, said shaft carrying a worm gear 28 near its lower end, which meshes with a worm 29 on shaft 30. This shaft 30 carries a gear 31 which meshes with a gear 32 on the engine crank shaft 33. In a four-cycle engine the valve driving gears will be so proportioned that the speed of the valve will be one-half the speed of the engine crank shaft.

In the construction shown in Figs. 1 and 2 lubricating oil will be delivered into the gear compartment, and from said compartment will flow through the slot or groove 25 into the groove 24 and channel 18 to the upper surface of the valve. The slot 25 will be so proportioned that it will permit just the right amount of lubricant to flow from the gear case to the rotary valve. The lubricant will also enter the spiral lubricating groove in the valve stem as the said stem rotates and the spiral groove registers with the inner end of the groove 24. The valve inlet port during the rotation of the valve will register with the lower end of the channel 18, thereby permitting lubricant to drop to the valve seat 6 and the continued rotation of the valve will distribute said lubricant over said seat so that the valve will be thoroughly lubricated both on its upper and lower surfaces.

From the foregoing it is manifest that I provide a valve gear of very simple construction which will be largely protected from the heat of the engine and from the pressure of the gases therein. It is also manifest that I provide a very simple and efficient valve driving means operated positively from the crank shaft of the engine and which may be accurately timed. I dispense with all seating springs and valve opening cams, rods, and such devices, which are usually employed for moving mechanically operated valves. The valve may be of large diameter and the ports correspondingly large, thereby insuring a full charge of explosive mixture and a complete exhaust of the cylinder.

The ports in the valve and in the engine cylinder are preferably sector-shape, whereby said valves may be increased with the increase in the diameter of the valve and of the engine. It is also apparent that should the valve be broken from the valve stem it can not drop into the engine cylinder.

It will, of course, be understood that the valve gears may be driven in any suitable manner from the crank shaft of the engine, and I do not wish to be limited in this respect.

Having thus fully described my invention, what I claim as new and desire to secure by Letters Patent is:

1. An explosion engine of the compression type comprising a cylinder, a valve seat formed with an inlet and an exhaust port, a rotary valve fitting to said seat and formed with a port, and means for automatically lubricating both faces of said valve by the rotation thereof.

2. An explosion engine of the compression type comprising a cylinder, a piston, a rotary valve, said valve being surrounded by cooling spaces, inlet and exhaust ports extending through said cooling spaces, means for driving said valve, and means for automatically feeding a lubricant to both faces of the valve as the latter rotates.

3. An explosion engine of the compression type comprising a cylinder, a piston, a rotary valve, said cylinder having a channel for a lubricant leading to the valve, cooling means surrounding said valve on the opposite faces thereof, inlet and exhaust ports extending through said cooling means, a gear for driving the valve, and means whereby the gear may feed a lubricant to the channel and to said valve.

4. An explosive engine of the compression type comprising a cylinder, a piston, a rotary valve, said cylinder having a channel for a lubricant leading to the valve, cooling means surrounding said valve, inlet and exhaust ports extending through said cooling means, a gear for driving the valve, and means whereby the gear may feed a lubricant to the channel and to both faces of said valve.

5. An explosion engine of the compression type comprising a cylinder, a piston, a rotary valve having a stem parallel to the cylinder axis and provided with a lubricating channel, means for holding a lubricant, said cylinder being provided with a bearing for the stem and a channel for a lubricant in said bearing leading to the valve, means for driving said valve, and means for feeding a lubricant to the channels through the valve rotating means.

6. An explosion engine of the compression type, comprising a cylinder, a valve seat provided with suitably arranged ports, a valve operating against said seat, and means for admitting a lubricant to both faces of the valve governed by the motion of the valve.

7. An explosion engine of the compression type, comprising a cylinder, a piston therein, a valve seat provided with suitably arranged inlet and exhaust ports, a rotary valve fitting said seat, means for driving said valve, and means for timing the admission of lubricant to both faces of said valve as the latter rotates.

8. An explosion engine of the compression type, comprising a cylinder, a piston therein, a rotary valve having its seat surrounded by cooling spaces, with inlet and exhaust ports extending through said cooling spaces, driving means for said valve, a lubricant container, a channel for a lubricant leading to the valve, and means whereby the motion of the valve admits the lubricant from said channel to the upper and lower surfaces to be lubricated.

9. In an explosion engine, the combination of a plurality of cylinders, having pistons, inlet and exhaust ports, a plurality of rotary valves surrounded by cooling spaces, said inlet and exhaust ports extending through said cooling spaces and controlled by said valves, means located intermediate the cylinders for simultaneously rotating the valves, a lubricant container, lubricating channels leading to said valves, and means whereby the motion of each valve controls the admission of the lubricant from said channels to the upper and lower valve surfaces intended to be lubricated.

10. An explosion engine of the compression type comprising a cylinder, an exterior valve seat at the end thereof formed with an inlet and an exhaust port, a rotary valve fitting said seat and formed with a port, a cylinder head inclosing said valve and formed with a lubricating channel adapted to register with the port in the valve as the valve rotates, whereby the lubricant will be delivered to the valve seat below the valve, a valve stem connected to the valve, and means connected to said stem for rotating the valve.

11. An explosion engine of the compression type comprising a cylinder, an exterior valve seat at one end thereof, and formed with an inlet and an exhaust port, a rotary valve fitting said seat and formed with a port, a cylinder head inclosing said valve and formed with a lubricating channel adapted to register with the port in the valve as said valve rotates, a valve stem connected to the valve, a valve driving gear mounted on said stem and formed with a slot adapted to register with the lubricating channel in the head, and means for rotating said gear.

This specification signed and witnessed this 28" day of April A. D. 1910.

EUGENE P. BATZEL.

Witnesses:
  P. G. VEAMER,
  P. ARMANER.